(12) United States Patent
Johnson

(10) Patent No.: US 8,490,979 B2
(45) Date of Patent: Jul. 23, 2013

(54) METHOD FOR REDUCING EXTRUSION OF SEALING ELEMENTS

(75) Inventor: Michael H. Johnson, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 848 days.

(21) Appl. No.: 11/713,985

(22) Filed: Mar. 5, 2007

(65) Prior Publication Data

US 2008/0217860 A1    Sep. 11, 2008

(51) Int. Cl.
*C04B 26/02*    (2006.01)
*E21B 33/00*    (2006.01)

(52) U.S. Cl.
USPC ............................. 277/322; 524/702; 524/925

(58) Field of Classification Search
USPC .................................. 277/322; 524/702, 925
See application file for complete search history.

(56) References Cited

U.S. PATENT DOCUMENTS

| | | | | |
|---|---|---|---|---|
| 2,884,060 A * | 4/1959 | Kao | ............................. | 162/169 |
| 3,770,480 A * | 11/1973 | Farnam | ......................... | 427/177 |
| 4,011,360 A | 3/1977 | Walsh | | |
| 4,203,607 A * | 5/1980 | Brieger | ......................... | 277/584 |
| 5,418,270 A * | 5/1995 | Peters | ............................ | 524/406 |
| 6,896,049 B2 | 5/2005 | Moyes | | |
| 2005/0028990 A1 * | 2/2005 | Atkins et al. | .................. | 166/387 |

FOREIGN PATENT DOCUMENTS

WO    01/81799 A    11/2001

OTHER PUBLICATIONS

Shell Chemical Company Publication SC: 198-92; "Kraton Polymers for Adhesives and Sealants", pp. 1, 3, 4-11, 13-47.
PCT Search Report Mailed Jun. 13, 2008. Reference No. 274-44571-WO. PCT Application No. PCT/US2008/050252. Search Report Having 6 Pages and Written Opiniion of the International Searching Authority Having 6 Pages.
R.J. Saucier, SPE-AIME, Shell Oil Co., "Considerations in Gravel Pack Design" Journal of Petroleum Technology, printed in Transactions vol. 257, Feb. 1974, pp. 205-212.
Tung V. Tran, Faruk Civan, SPE, University of Oklahoma and Iam Robb, SPE, Halliburton Services, "Correlating Flowing Time and Condition for Perforation Plugging by Suspended Particles", SPE 120847, Sep. 2009, SPE Drilling & Completion, pp. 398-403.
Yan Jienian, SPE, and Feng Wenqiang, China U. of Petroleum, Beijing, "Design of Drill-in Fluids by Optimizing Selection of Bridging Particles", SPE 104131, Presentation at 2006 SPE International Oil & Gas Conference and Exhibition Beijing, China, Dec. 5-7, 2006, Society of Petroleum Engineers, pp. 1-9.
A. Abrams, SPE-AIME, Shell Development Co., "Mud Design to Minimize Rock Impairment Due to Particle Invasion", SPE 5713, presented at the SPE-AIME Second Symposium on Formation Damage control Houston, Jan. 29-30, 1976, Society of Petroleum Engineers, pp. 586-592.

\* cited by examiner

*Primary Examiner* — Robert D. Harlan
(74) *Attorney, Agent, or Firm* — Cantor Colburn LLP

(57) ABSTRACT

A sealing element includes an elastomeric matrix; a plurality of incorporants embedded in the matrix.

16 Claims, 1 Drawing Sheet

METHOD FOR REDUCING EXTRUSION OF SEALING ELEMENTS

BACKGROUND OF THE INVENTION

Sealing elements used in downhole fluid recovery operations are a very well known, invaluable and generally available for a variety of applications in downhole fluid recovery operations. Packers, bridge plugs, nipple plugs, are just a few devices that incorporate sealing elements which are needed to separate zones, segregate pressure differentials, etc.

Many sealing elements are composed of elastomeric material as such material lends itself to excellent sealing even in bores that are not perfectly round due to the ability of the elastomer to flow or conform to a surface. The elastomer can thus easily become eccentric upon setting compression being applied.

While sealing elements generally work very well for their intended purpose, they do have limitations. One thing that presents problems for well operators is well conditions having dramatically differing pressures across the sealing element. Such conditions can cause the sealing element to extrude and thereby fail. Prophylactic measures to prevent this occurrence include the provision of metal barriers used to support the sealing element or metal barrier extending from a mandrel or from a tubing or casing segment at which the sealing element is (or is to be) set. The purpose of the barrier is to reduce the open space through which the sealing element could be extruded. One area of concern is the amount of precision possible in nested structures downhole. Such precision is relatively low, due to having to pass through many thousands of feet of wellbore. Therefore, the gap left beyond the barrier is still large enough to allow extrusion of the sealing element therethrough. In addition, because the barriers are only supported on the inside dimension or the outside dimension, and generally not both, they are susceptible to breaking themselves, thereby leaving the packer unprotected from extrusion. There are other areas where extrusion of the sealing element is a concern which will be readily apparent to those skilled in the art of seal design.

The art would welcome a configuration that reliably reduces extrusion of sealing elements.

SUMMARY

A sealing element includes an elastomeric matrix; a plurality of incorporants embedded in the matrix.

A method of making an extrusion resistant sealing element includes mixing an amount of elastomeric material with an amount of at least one incorporant having a particle size greater than about 100 microns; rendering the mixture relatively homogeneous; and forming an annular shape with the mixture.

BRIEF DESCRIPTION OF THE DRAWINGS

Referring now to the drawings wherein like elements are numbered alike in the several Figures.

DETAILED DESCRIPTION OF THE DRAWINGS

Figure 1:
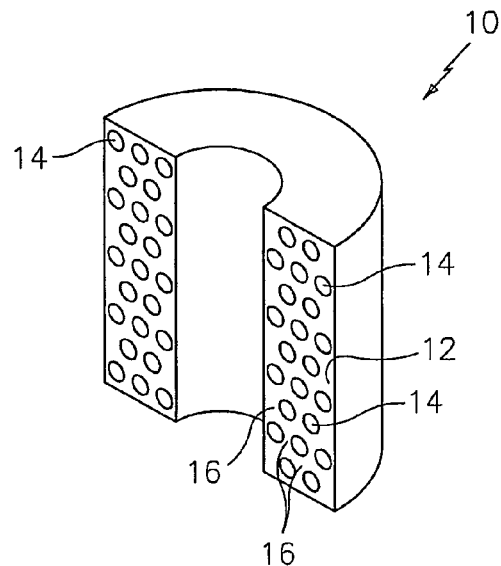
FIG. 1 is a schematic cross-sectional representation of one sealing element usable in a downhole application in accordance with the disclosure hereof.

Referring to FIG. 1, a sealing element 10 alleviates the aforementioned drawbacks associated with extrusion of sealing elements during use. Sealing element 10 comprises an elastomeric matrix 12 and a plurality of rigid incorporants 14 therein. Incorporants 14 may be of any shape and of any material resistive of significantly changing shape at pressures anticipated to be encountered during use of the sealing element 10. By adding incorporants 14 to elastomeric matrix 12, the resistance to extrusion of the sealing element 10 is dramatically increased. This is because a relatively homogeneous mixture of incorporants with the matrix 12 creates interstitial spaces of soft matrix material with hard material (the incorporants). Resultantly, the potentially extrudable material (the matrix material) must begin the extrusion process by moving through the interstitial spaces 16 between the incorporants instead of through whatever space the sealing element is sealing. Clearly the interstitial spaces are much smaller than an annulus being sealed by the sealing element. This means that the forces required to be in an extrusion process need to be high enough to move the matrix material through these very small spaces. It will be appreciated that causing a fluid to flow through a small space is much more difficult than causing the same fluid to flow through a larger space. Thus it is axiomatic that the force required to cause that flow to occur is necessarily much greater. This property is of use in the present invention. Because incorporants are added, thereby increasing the forces needed to begin the extrusion process, a much greater resistance to extrusion is exhibited. A significantly higher pressure than otherwise required to extrude a common sealing element, is needed to cause the extrusion of the sealing element as described herein because of the interstitial spaces 16 as noted.

The incorporants themselves can, as noted above, be of any shape but it should be noted that more irregular shapes may further enhance the extrusion resistance of the packer hereof through an increase in the coefficient of friction of the incorporants experienced by the matrix material.

Incorporants 14 in one embodiment range in size from about 100 to about 2000 microns even the low limit of which is significantly larger than the size of particulate matter added to matrix material for color or for other properties of the matrix material itself. Further, in one embodiment the size range of incorporants is about 250 to about 1000 microns. Relatively high strength materials also having resistance to downhole environmental conditions improve the extrusion resistance since they themselves tend to resist deformation and corrosion, which might reduce the desired resistance. Therefore particles of stainless steel, inconel, nickel, and similar materials occur either alone or in combination, the combination being where different particles are of different material and where each particle may include different materials in an alloy or even simply as an aggregate, in embodiments of this invention. In some embodiments of the invention even two, three or more different sizes of particle and/or two, three or more different materials are represented.

An effective incorporant volumetric relationship is from about 20 percent to about 80 percent incorporant matter relatively homogeneously mixed with the matrix material. Selection of the percentage is somewhat dependant on incorporant size as it is desirable that the matrix material does significantly encase each particle of incorporant. Therefore where the incorporant size is small, a higher percentage is desirable and where the incorporant size is larger, a lower percentage is more desirable. For example, in an embodiment that utilizes a 500 micron particle size incorporant, the incorporant would represent 35 to 60 percent of the sealing element material.

Figure 2:
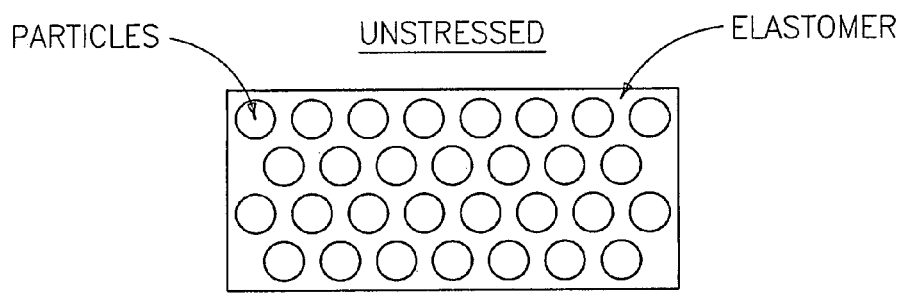
FIG. 2 is a schematic cross-sectional representation of the material of a sealing element in accordance with the disclosure hereof in a non-compressed condition.
Figure 3:
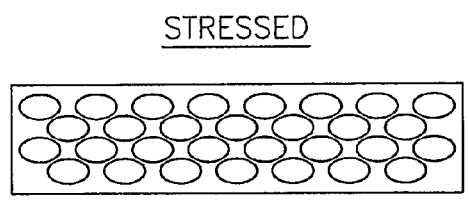
FIG. 3 is a schematic cross-sectional representation of the material of a sealing element in accordance with the disclosure hereof in a compressed condition.

In addition to the fact that the sealing element material itself having mixtures of matrix and incorporant as stated will have a higher resistance to extrusion per se, it is also important to note that because sealing elements are employed in a condition where they are highly compressed, the interstitial spaces become even smaller thereby increasing the extrusion resistance even more. Reference is made to FIGS. 2 and 3 where the same schematic view is presented with FIG. 2 at rest and FIG. 3 in compression. The difference is plain to see. This allows for wider extrusion gaps in downhole tools and even higher pressure differentials. In view hereof, the sealing element material as disclosed herein represents a substantial improvement in sealing element technology and therefore an important improvement for the art.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A sealing element comprising:
   an extrusion resistant elastomeric matrix;
   a plurality of rigid incorporants ranging in size from about 100 to about 2000 microns in diameter embedded and maintained in the matrix during sealing.

2. The sealing element as claimed in claim 1 wherein the plurality of incorporants are greater than about 100 microns in size.

3. The sealing element as claimed in claim 1 wherein the plurality of incorporants are less than about 2000 microns in size.

4. The sealing element as claimed in claim 1 wherein the plurality of incorporants are greater than about 250 microns in size.

5. The sealing element as claimed in claim 1 wherein the plurality of incorporants are less than about 1000 microns in size.

6. The sealing element as claimed in claim 1 wherein at least one of the plurality of incorporants is of a size distinct from at least one other of the plurality of incorporants.

7. The sealing element as claimed in claim 1 wherein the plurality of incorporants are of at least three different sizes.

8. The sealing element as claimed in claim 1 wherein the plurality of incorporants are each of the same material.

9. The sealing element as claimed in claim 1 wherein the plurality of incorporants are of more than one material.

10. The sealing element as claimed in claim 1 wherein the plurality of incorporants are each of more than one material.

11. A sealing element comprising:
    an extrusion resistant elastomeric matrix;
    a plurality of rigid incorporants ranging in size from about 100 to about 2000 microns in diameter embedded and maintained in the matrix during sealing, wherein the plurality of incorporants are of metal.

12. The sealing element as claimed in claim 1 wherein the plurality of incorporants are spherical.

13. The sealing element as claimed in claim 1 wherein the plurality of incorporants are non-spherical.

14. The sealing element as claimed in claim 1 wherein the plurality of incorporants represent greater than about 20 percent of the material of the sealing element.

15. The sealing element as claimed in claim 1 wherein the plurality of incorporants represent less than about 80 percent of the material of the sealing element.

16. The sealing element as claimed in claim 1 wherein the rigid incorporants are made from a material having a modulus of rigidity of at least about 65 to 80 GPa.

* * * * *